US009953300B2

United States Patent
Connor

(10) Patent No.: US 9,953,300 B2
(45) Date of Patent: Apr. 24, 2018

(54) SYSTEM AND METHOD TO PROCESS DISTRACTED DRIVING HABITS OF DRIVERS

(71) Applicant: DRIVESPI, L.L.C., Apollo Beach, FL (US)

(72) Inventor: Craig Connor, Lecanto, FL (US)

(73) Assignee: DRIVESPI, L.L.C., Apollo Beach, FL (US)

( * ) Notice: Subject to any disclaimer, the term of this patent is extended or adjusted under 35 U.S.C. 154(b) by 333 days.

(21) Appl. No.: 14/725,018

(22) Filed: May 29, 2015

(65) Prior Publication Data

US 2015/0356506 A1 Dec. 10, 2015

Related U.S. Application Data

(60) Provisional application No. 62/010,019, filed on Jun. 10, 2014.

(51) Int. Cl.
*G06K 9/00* (2006.01)
*G06Q 10/10* (2012.01)
*G06F 17/30* (2006.01)

(52) U.S. Cl.
CPC ..... *G06Q 10/101* (2013.01); *G06F 17/30247* (2013.01); *G06K 9/00845* (2013.01)

(58) Field of Classification Search
CPC .......... G06F 17/30247; G06K 9/00845; G06Q 10/101
See application file for complete search history.

(56) References Cited

U.S. PATENT DOCUMENTS

| | | | | |
|---|---|---|---|---|
| 9,031,545 B1 * | 5/2015 | Srey | ...................... | H04W 4/046 340/3.1 |
| 9,524,269 B1 * | 12/2016 | Brinkmann | ............. | G06F 17/00 |
| 9,535,878 B1 * | 1/2017 | Brinkmann | ............. | G06F 17/00 |
| 2011/0077028 A1 * | 3/2011 | Wilkes, III | ............ | B60W 50/14 455/456.3 |
| 2013/0150004 A1 * | 6/2013 | Rosen | ..................... | H04W 8/22 455/414.1 |
| 2014/0177925 A1 * | 6/2014 | Wu | ....................... | G08G 1/0175 382/105 |
| 2014/0285315 A1 * | 9/2014 | Wiewiora | .......... | G07C 9/00158 340/5.53 |
| 2015/0186714 A1 * | 7/2015 | Ren | ..................... | G06K 9/00369 348/77 |

* cited by examiner

*Primary Examiner* — Amara Abdi
(74) *Attorney, Agent, or Firm* — Trenner Law Firm, LLC; Mark D. Trenner

(57) ABSTRACT

A system and method to process distracted driving habits of drivers. An example computer-implemented method to process distracted driving habits of drivers includes receiving a transmission of at least one electronic image from an imaging device, the electronic image showing a distracted driver. The method also includes processing the at least one electronic image by a computer to associate the image with a distracted driving category. The method also includes delivering a report based on the processed image.

8 Claims, 8 Drawing Sheets

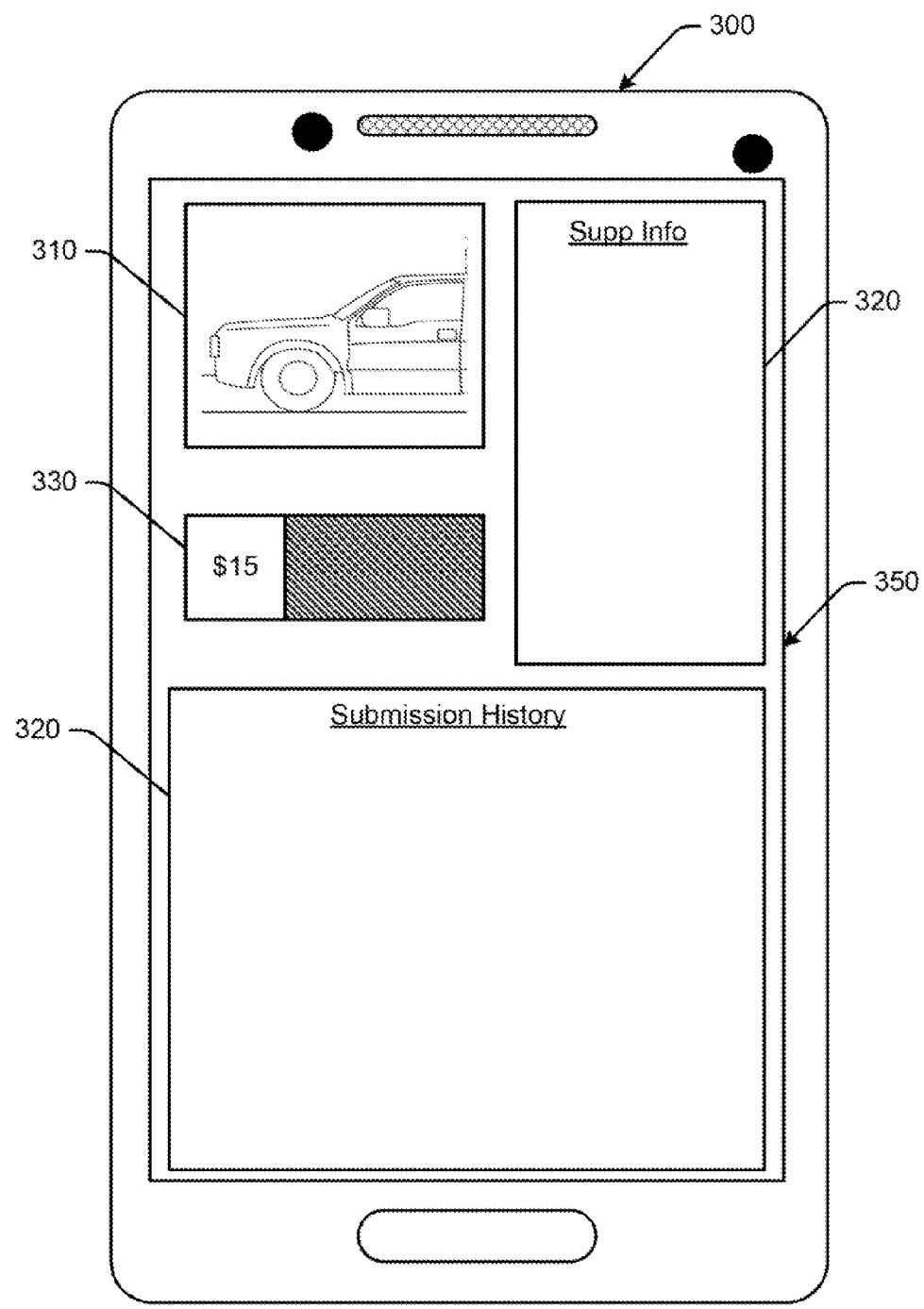

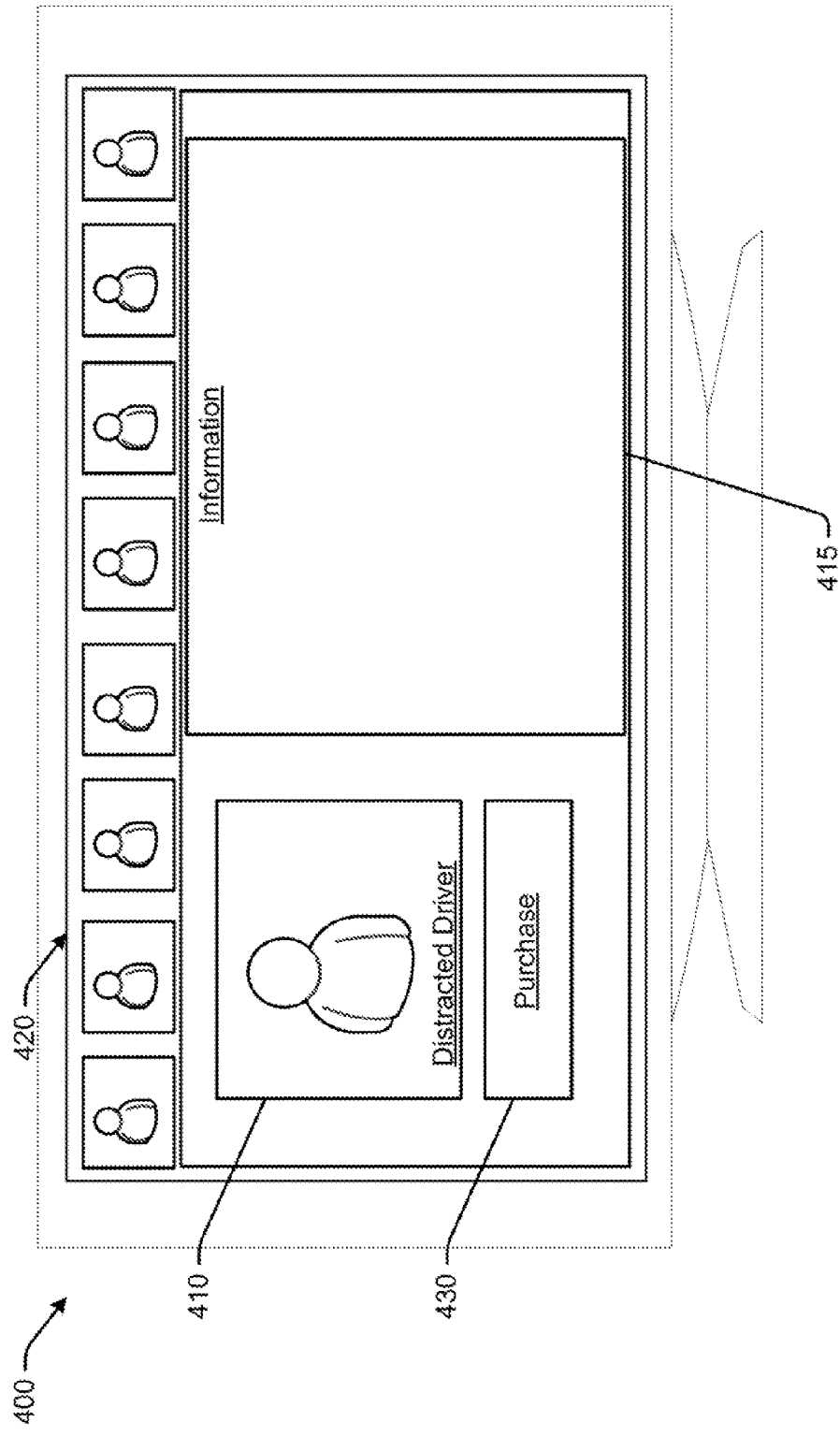

SYSTEM AND METHOD TO PROCESS DISTRACTED DRIVING HABITS OF DRIVERS

PRIORITY CLAIM

This application claims the priority filing date of U.S. Provisional Patent Application 62/010,019 filed Jun. 10, 2014 and titled "System and Method To Deter Distracted Driving" of Craig Connor, hereby incorporated by reference for all that it discloses as though fully set forth herein.

BACKGROUND

Driving while engaging in another activity that takes your attention away from driving (e.g., using a phone or "texting," even eating or tuning the radio) is referred to as "distracted driving" and can result in a motor vehicle crash. In many jurisdictions, distracted driving is illegal. It is believed that every day in the United States more than 9 people are killed, and more than 1,060 people are injured in crashes that are reported as involving a distracted driver.

BRIEF DESCRIPTION OF THE DRAWINGS

FIG. 3 shows an input device illustrating example input to the system and method to process distracted driving habits of drivers.

FIG. 4 shows an output device illustrating example output of the system and method to process distracted driving habits of drivers.

DETAILED DESCRIPTION

Figure 1:
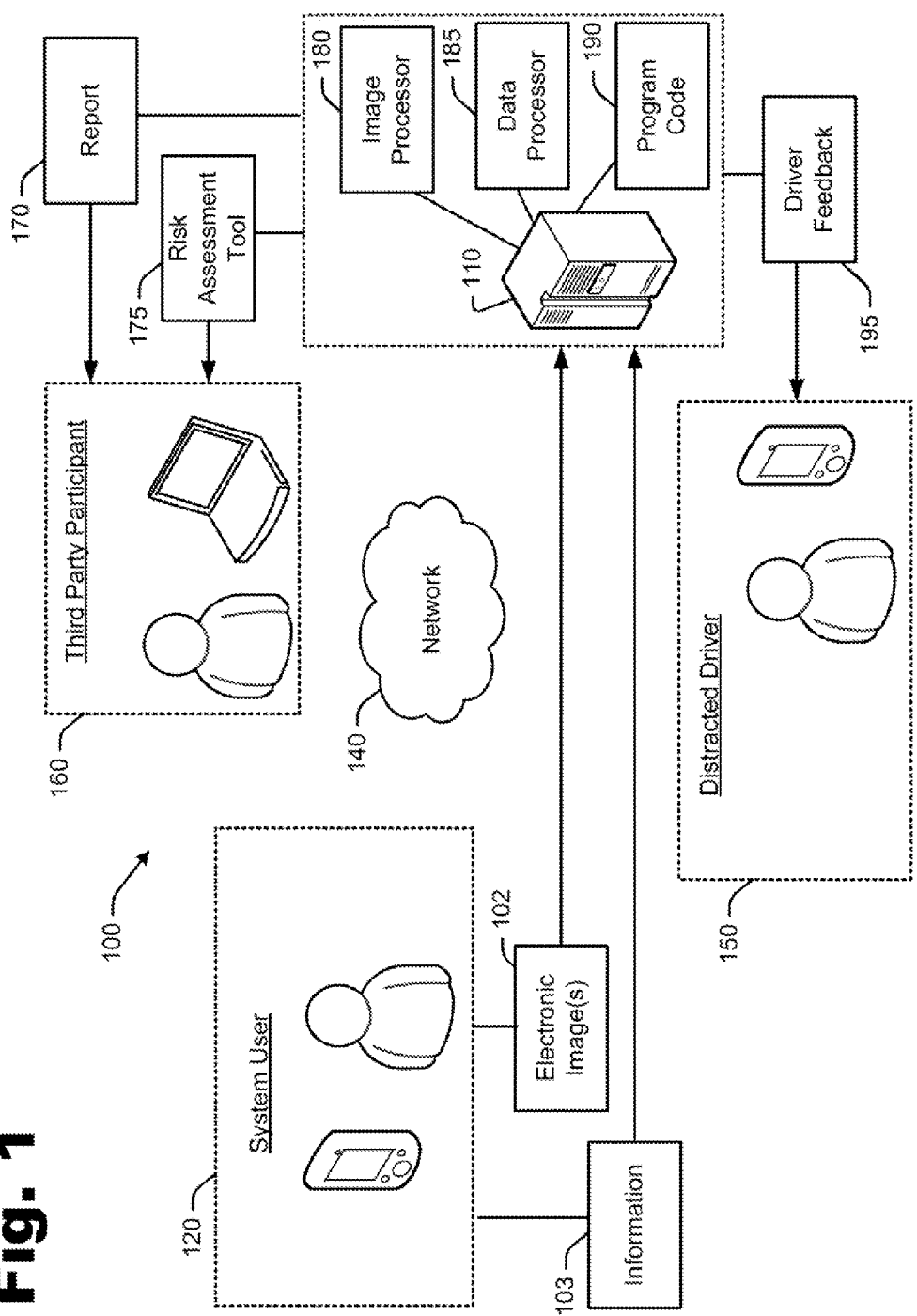
FIG. 1 is a block diagram of an example networked computer system configured to process distracted driving habits of drivers.

A system and method to process distracted driving habits of drivers is disclosed herein. In an example, the system and method collect, catalog, and/or distribute videos and/or other information, and may further deter distracted driving.

An example method collects videos, photographs and/or other data (e.g., via cameras, cell phones, video equipment, etc). Individuals and/or entities collecting this information may be compensated for submissions. The example method catalogs the data (e.g., photos and/or videos) by license plate number in a searchable database accessible to clients. The photos, videos and/or other data may also be copyrighted. The compiled or transformed data may be distributed and/or sold individually or on a subscription basis.

An example system implements a recording device (e.g., a camera) to capture image(s) (e.g., video or still photograph) of a distracted driver. The image may be captured by anyone who witnesses distracted driving, such as a passenger in the same or another vehicle, a pedestrian, other driver (e.g., who has safely stopped their own vehicle), or other person (including but not limited to employees or independent contractors specifically paid to identify distracted drivers).

The image(s) may be transferred (e.g., uploaded via a mobile or other internet connected device) to a compilation service. In an example, an online submission form is provided to enable image transfer. The image(s) may be stored, for example, by a database or other data structure. The compilation service may sort, combine, and/or otherwise process the images and other data (e.g., date, end-user, vehicle information, etc.) and generate an output (e.g., reports) for insurance companies, law enforcement, parents, and/or other third parties).

In an example, reports generated by the system and method disclosed herein may be auctioned to the highest bidder. In an example, the reports may be offered to a primary market within a predefined time (e.g., to members within the first 90 days), and then offered on a secondary market, (e.g., to insurance companies, law enforcement, personal injury law firms, etc). Another market may include on-demand access. Subscription based purchases, and/or no-fee reports may also be made available.

In an example, the system and method may deter distracted driving by providing feedback to drivers "caught" exhibiting distracted driving. For example, the insurance company, law enforcement, parents, and/or other third parties may provide this feedback to the driver, such as with higher insurance premiums, a warning or citation from the police, parental discipline, and/or other penalties.

Before continuing, it is noted that as used herein, the terms "includes" and "including" mean, but is not limited to, "includes" or "including" and "includes at least" or "including at least." The term "based on" means "based on" and "based at least in part on." In addition, the term "distracted driving" and variations thereof, means engaging in another activity that takes attention away from driving, whether that other activity may or does actually result in reckless or other dangerous driving, whether intentional or not the activity is intentional.

FIG. 1 is a block diagram of an example networked computer system 100 configured to process distracted driving habits of drivers. In an example, the system 100 is configured to collect, catalog and distribute distracted driving videos for example, for a risk assessment tool (e.g., for insurance companies), law enforcement for traffic enforcement, and civil court cases to establish patterns of behavior, to name only a few examples.

System 100 may be implemented with any of a wide variety of computing devices, such as, but not limited to, mobile devices (e.g., a mobile phone or tablet or "phablet") and stand-alone computing systems (e.g., a server computer), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute operations described herein as program code.

In an example, the system 100 may include a host 110 which may receive input from a system user 120 (e.g., a person with a mobile device). For purposes of illustration, the host 110 may be a server computer including a processor configured to execute program code 130 stored on computer-readable media. The host 110 may also include interfaces to application programming interfaces (APIs) and related support infrastructure, such as but not limited to a database engine.

It is noted that the host 110 and client 120 are not limited to any particular type of device(s). In addition, it is noted that the program code 130 may reside at least in part on a server computer and/or at least in part on a mobile computing device (e.g., as an "app"), each of which may communicate with each other over a network 140. For example, the operations described herein may be part of a cloud-based service. In an example, the network 140 includes the Internet or other mobile communications network (e.g., a 3G or 4G mobile device network). Network 140 provides accessibility in distributed environments, for example, where more than one user may have input and/or receive output of the system 100.

In addition, the system 100 may include or otherwise be associated with at least one source of content. That is, the source may be part of the system 100, and/or the source may be physically distributed in the network and operatively associated with the system 100. There is no limit to the type or amount of content that may be provided. For example, the content may include private data (e.g., provided by car insurance databases) and/or government data (e.g., provided by department of motor vehicle databases). In addition, the content may include unprocessed or "raw" data, or the content may undergo at least some level of processing.

It is noted that the components shown in FIG. 1 are provided only for purposes of illustration of an example operating environment, and are not intended to limit implementation to any particular system.

Various operations to process distracted driving habits of drivers may be implemented with devices (e.g., as illustrated in FIG. 1) and at least in part as program code. In an example, the program code may be implemented in machine-readable instructions (such as but not limited to, computer software). The machine-readable instructions may be stored on a non-transient computer readable medium and are executable by one or more processor to perform the operations described herein. However, the operations described herein are not limited to any specific implementation with any particular type of devices and/or program code.

The system 100 may process information received from the user (e.g., one or more electronic images 102 of a distracted driver 150) and/or information provided by government and/or other sources (e.g., highway cameras). The system may generate output (e.g., in the form a report 170 or other output such as may be provided by a risk assessment tool 175) for a third party participant 160 (e.g., insurance, law enforcement, and/or others).

An example risk assessment tool 175 may be configured to establish a pattern of behavior (e.g., based on prior reports, public records such as police reports or news reports, and/or private data such as insurance company data). The risk assessment tool 175 may assess risk of future distracted driving by the distracted driver, for example, based on a history of distracted driving.

In an example, system 100 may implement a payment processor to encourage system users 120 to submit electronic images 102 of distracted drivers 150 and/or to receive payment for providing reports and other output (e.g., to third party recipient 160). In an example, system users 120 may be paid based on the number of instances reported, the quality of reporting (e.g., number of identifiable photographs), or any other suitable criteria. In an example, third party participants and/or the distracted driver may pay for reports and/or other output generated by the system 100.

An example system 100 to process distracted driving habits of drivers 150 may include an image processor 180 configured to extract information from at least one electronic image 102 showing a distracted driver 150. For example, the image processor 180 may include image recognition hardware and/or software to identify a license plate and/or other identifying information in the electronic image 102.

In an example, the image processor 180 may also be configured to confirm that the electronic image 102 includes an instance of distracted driving. For example, the image processor 180 and/or a data processor 185 may be include data processing hardware and/or software which categorizes the electronic image 102, e.g., based on the image data itself (e.g., image analysis, video analysis) and/or supplemental information 103 provided with the electronic image (e.g., metadata or text input by the system user 120). Other data may also be provided (e.g., GPS coordinates, time, weather).

Based on the category (e.g., "texting," "eating while driving", "DWUI"), the system 100 confirms the electronic image 102 includes an instance of distracted driving. Further processing may be implemented to associate the instance of distracted driving with a distracted driver 150 (e.g., based on motor vehicle records, image recognition, etc.). For example, the image processor 180 may sort the electronic image 102 by a license plate number, and the license plate may be searched in a database to associate the license plate with a driver or owner of the vehicle.

The example system 100 may also include an output device 190 configured to report the distracted driver 150. In an example, output (e.g., a report) may be issued to the authorities (e.g., local law enforcement), or to an insurance database or other third party participant 160. In another example, the output may be issued in the form of driver feedback 195. For example, driver feedback may include an alert delivered to the driver (e.g., a light on the car stereo) or via email or phone message for retrieval when the driver is safely parked or is no longer driving, warning the driver that they have been identified engaging in distracted driving behavior. This feedback in and of itself may deter future incidents of distracted driving. Feedback 195 may also be issued in the form of a notification to a parent or guardian of the distracted driver 150, e.g., so that appropriate parental controls may be implemented.

Figure 2A:
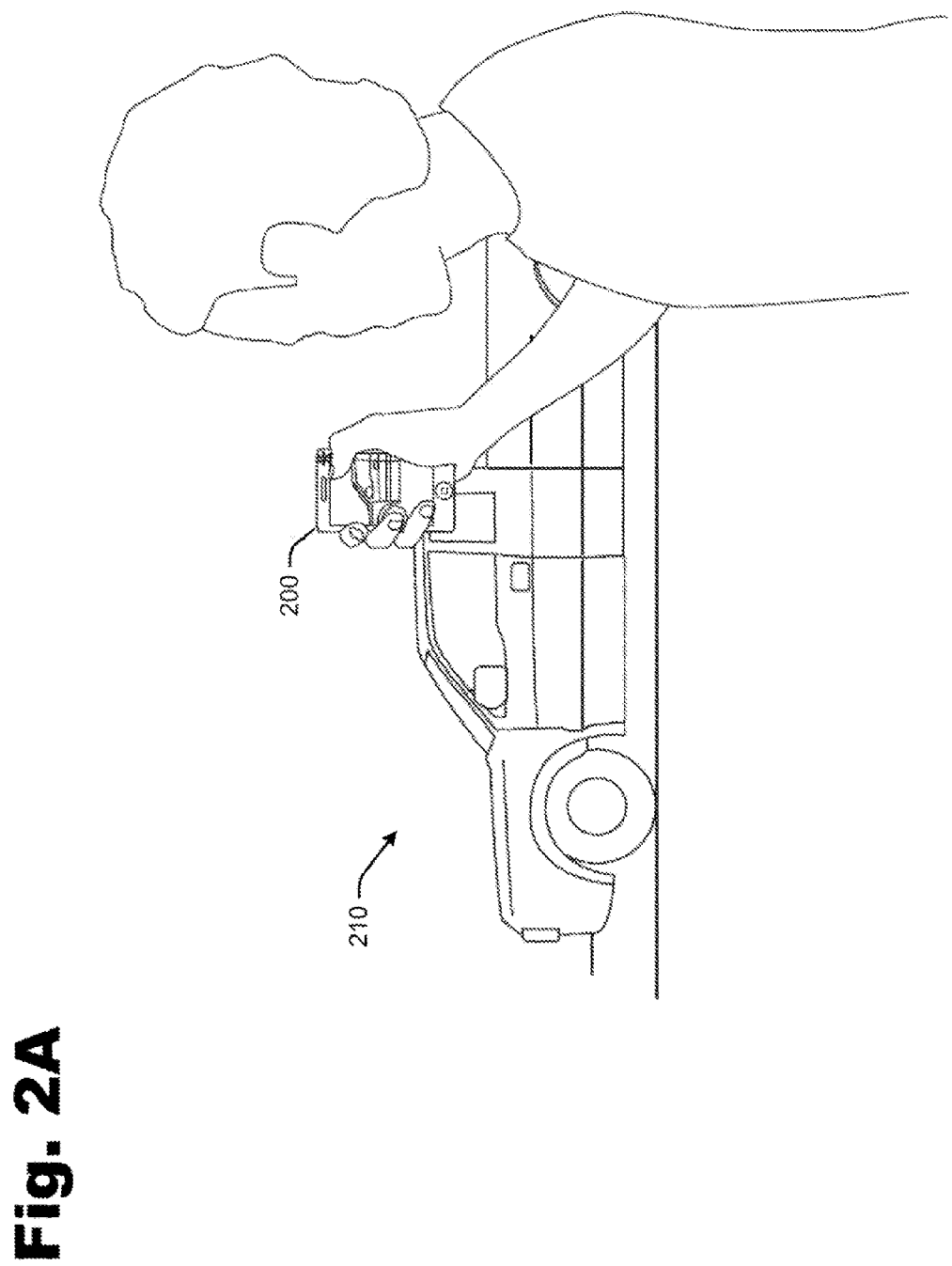
FIGS. 2A-C illustrate an example the system and method to process distracted driving habits of drivers, wherein A) illustrates image capture of a distracted driving event, B) illustrates image capture of a driver engaged in the distracted driving event, and C) illustrates image capture of identifying information such as a license plate.
Figure 2B:
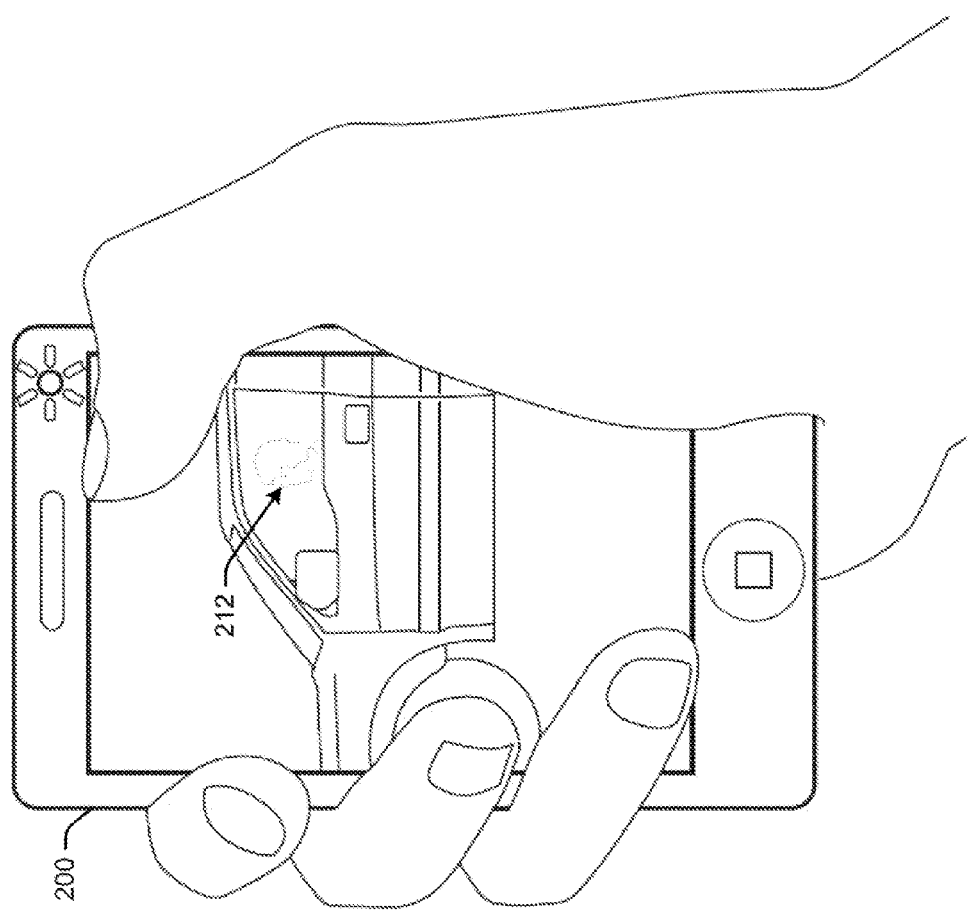
Figure 2C:
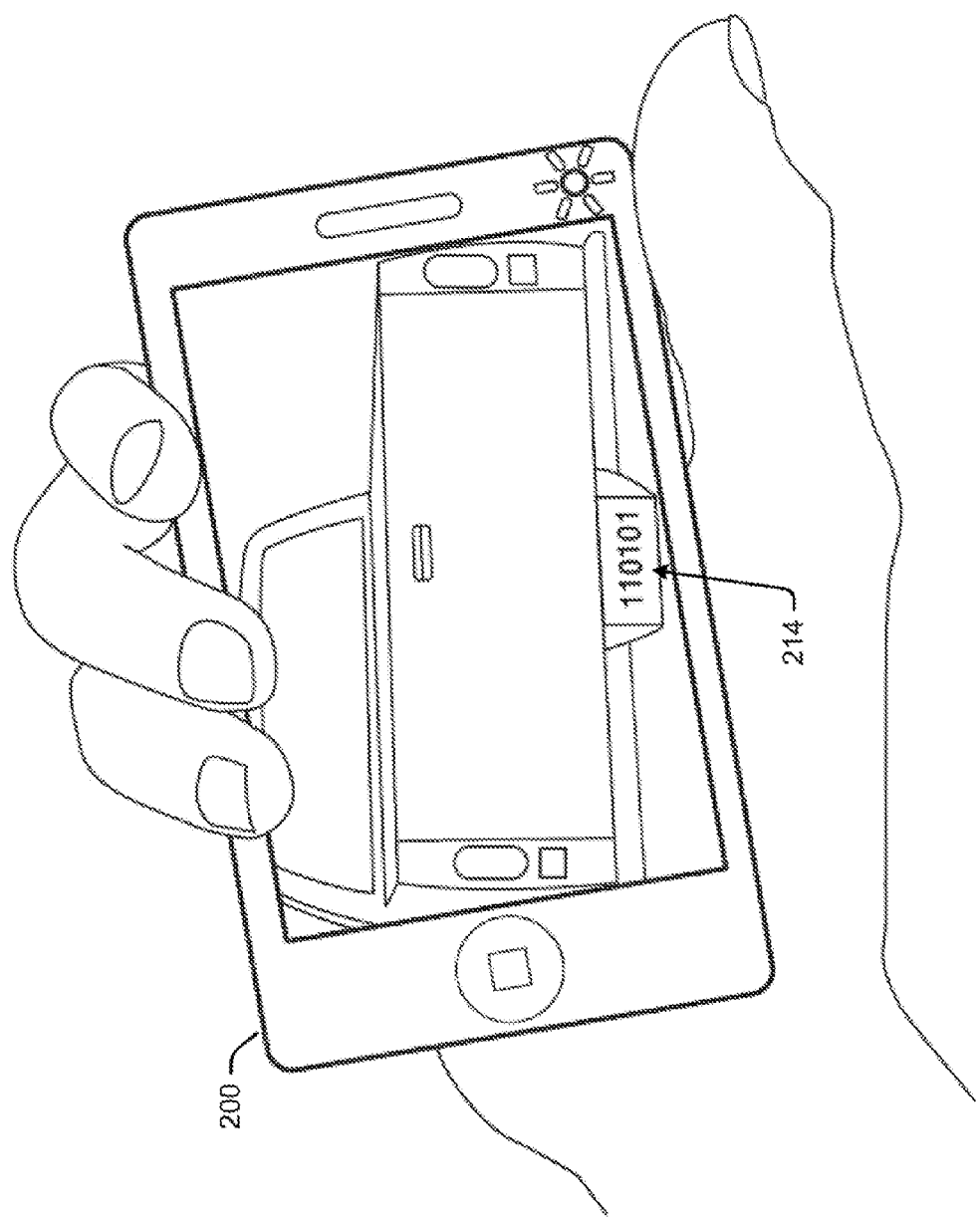

FIGS. 2A-C illustrate an example the system and method to process distracted driving habits of drivers. FIG. 2A illustrates image capture of a distracted driving event 210 with an imaging device 200 such as a mobile phone. FIG. 2B illustrates image capture of a driver 212 engaged in the distracted driving event. FIG. 2C illustrates image capture of identifying information such as a license plate 214.

In an example, a distracted driver may be spotted by any person (or automatic camera such as a traffic camera) capable of storing and transferring electronic image files. The image(s) may be captured and recorded on a camera or other device, and may be submitted (e.g., via Internet or wireless carrier upload) to a device capable of storing such electronic images. In an example, the images may be limited in size (e.g., to no longer than three (3) minutes of video and/or photo files to no more than 5 MB in size).

FIG. 3 shows an input device 300 such as a mobile phone, illustrating example input to the system and method to process distracted driving habits of drivers. By way of illustration, a system user who sees a driver who is engaged in distracted driving (e.g., texting on a mobile device, eating while driving, or performing any other task while driving)

may capture one or more image 310 (e.g., a still or video image) of the driver and the driver's car. The image 310 may be submitted with other information 320 input by the user and/or embedded in the image itself (metadata such as time/date stamp) and/or otherwise gathered (e.g., GPS signal of the phone).

FIG. 3 also shows an example interface 350 which may be implemented as a phone "app." The example interface 350 illustrates the system user's submission history 320, and payment history 330.

In an example, the electronic image may be processed to confirm that the scene captured visibly and clearly shows identifying information, such as the license plate number and the state or province on the license plate. Further checks may also be implemented, such as confirming that the license plate shown in the image corresponds to the vehicle shown performing the distracted driving, and that all images were captured at substantially the same time, such that it is clear that the driver was not set up.

In an example, image processing may include accepting (or rejecting an unconfirmed image), cataloging, and storing images in the form of electronic files. The images may be further processed, e.g., based on data in a database and/or external source(s) of data. In an example, the system may process the images and/or other data, by researching and verifying submitted images for validity, duplications, previous submissions, and/or image editing with the intent to defraud. The system may reject any image that includes edited, offensive, and/or otherwise inappropriate content.

The image(s) may be processed automatically and/or manually. Processing may be fully and/or partially automated. For example, the processing may include the system automatically gathering related information for the license plate and/or previous offenses, and manual screening for inappropriate images. In other examples, screening may be at least partially automated, e.g., by using known image recognition techniques.

In an example, the images and/or processed information may be made available to interested parties, e.g., in the form of a report and/or risk assessment tool. Interested parties may include, but are not limited to law enforcement agencies, insurance companies, or other parties (e.g., concerned citizens or news agencies).

FIG. 4 shows an output device 400 illustrating example output of the system and method to process distracted driving habits of drivers. In an example, the output may include a report and/or risk assessment tool. In the illustration of FIG. 4, a distracted driver 410 may be selected from a listing of distracted drivers 420. Information 415 for the distracted driver 410 (or incident or incidents) may be provided. The report may be purchased, e.g., by the distracted driver or other interested party, e.g., by selecting the payment button 430.

In an example, images may be cataloged and a report generated. For example, images may be cataloged according to color, make, and model year (visible in a rear image of the vehicle), and the database may be searchable by the first three digits of the license plate (not visible to the public). Different categories of reports may be cataloged. For example, categories may include "first-time offender," "teen driver," "repeat offender," and "road rage," to name only a few examples. The report may provide undisputable (or at least difficult to dispute) evidence of criminal or other dangerous act.

In an example, the report may be purchased and a portion of these purchase funds may be given to the person who submitted the images, e.g., for transfer or license of copyright. In an example, the system user is only compensated if the report is purchased. Payment may be made in any form, such as but not limited to being transferred directly to an account such as a PAYPAL™ account or to a reloadable debit card. The system may notify an image submitter via email of the sale/purchase of an image.

Before continuing, it should be noted that the examples described above are provided for purposes of illustration, and are not intended to be limiting. Other devices and/or device configurations may be utilized to carry out the operations described herein.

Figure 5:
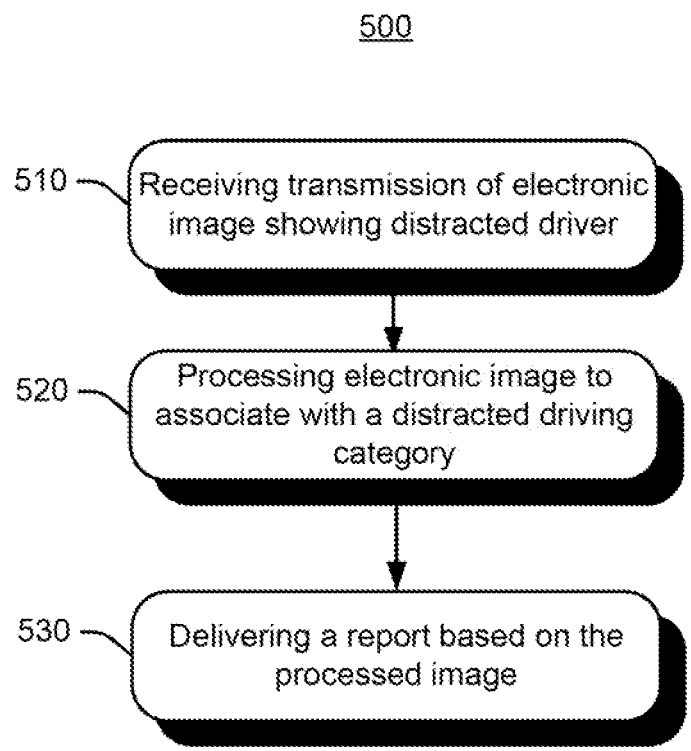
FIG. 5-6 are flowcharts illustrating example operations which may be implemented to process distracted driving habits of drivers.
Figure 6:
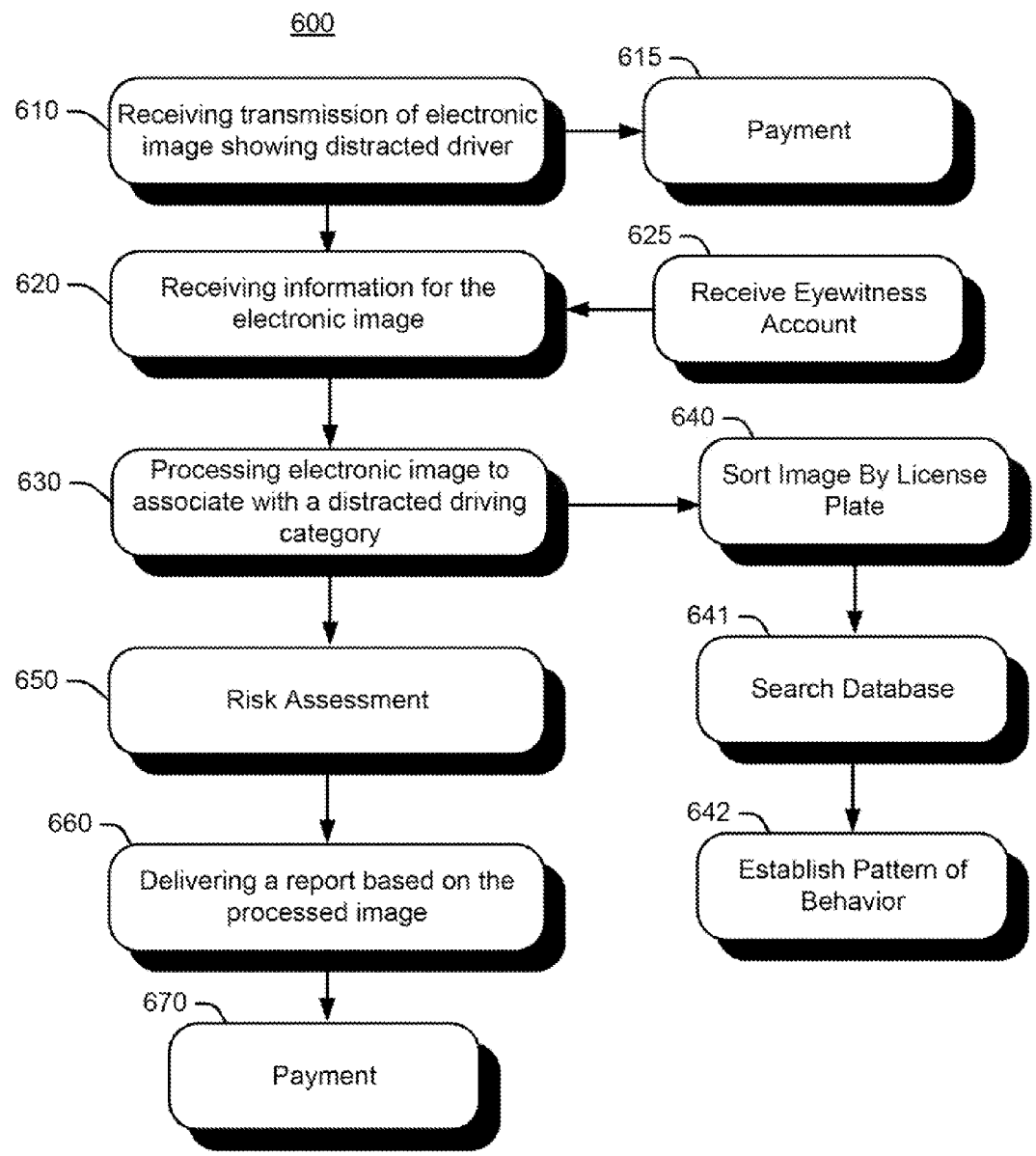

FIG. 5-6 are flowcharts illustrating example computer-implemented operations which may be implemented to process distracted driving habits of drivers. Operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In an example illustrated in FIG. 5, operation 510 includes receiving a transmission of at least one electronic image from an imaging device, the electronic image showing a distracted driver. Operation 520 includes processing the at least one electronic image by a computer to associate the image with a distracted driving category. Operation 530 includes delivering a report based on the processed image.

The operations shown and described herein are provided to illustrate example implementations. It is noted that the operations are not limited to the ordering shown.

In an example illustrated in FIG. 8, operation 610 includes receiving a transmission of at least one electronic image from an imaging device, the electronic image showing a distracted driver. Operation 615 includes payment processing. For example, operations may include providing a payment for transmission of the at least one electronic image.

Operation 620 includes receiving transmission of information for the at least one electronic image. For example, supplemental information for the at least one electronic image may include an eyewitness account (e.g., recorded via keyboard or voice input at the user's mobile device). In another example, the user may be prompted to answer a series of questions. Other information may be obtained automatically (e.g., location data from a GPS). Still other information may be provided and/or obtained.

Operation 630 includes processing the at least one electronic image by a computer to associate the image with a distracted driving category. By way of illustration, operation 640 includes sorting the at least one electronic image by a license plate shown in the at least one electronic image. Operation 641 includes searching a database for the license plate in the at least one electronic image. Operation 642 includes establishing a pattern of behavior.

Still other operations may also be implemented. By way of illustration, operation 650 includes risk management. For example, assessing risk for future distracted driving by the distracted driver may be based on processing the at least one electronic image and a risk assessment tool. Operation 660 includes delivering a report or other output based on the processed image. Operation 670 includes receiving a payment for delivering the report.

The operations may be implemented at least in part using an end-user interface (e.g., an "app" or other web-based interface). In an example, the end-user is able to make predetermined selections, and the operations described above are implemented on a back-end device to present results to a user. The user can then make further selections. If is also noted that various of the operations described herein may be automated or at least partially automated.

It is noted that the examples shown and described are provided for purposes of illustration and are not intended to be limiting. Still other examples are also contemplated.

The invention claimed is:

1. A computer-implemented method to process distracted driving habits of drivers, comprising:
   receiving, by a compilation service, a transmission of at least one electronic image from a mobile camera, the electronic image showing a distracted driver, wherein the distracted driver is spotted by a person using the mobile camera;
   processing the at least one electronic image by a computer to associate the at least one electronic image with a distracted driving category;
   assessing risk for future distracted driving by the distracted driver spotted by the person using the mobile camera, based on processing the at least one electronic image and a risk assessment tool; and
   delivering a report based on the processed at least one electronic image
   both user and third party receiving payment for delivering the reports; and
   another third party purchases and paying for the report.

2. The method of claim 1, further comprising providing a payment for transmission of the at least one electronic image.

3. The method of claim 1, further comprising at least one of a user and a third party receiving a payment for delivering the report.

4. The method of claim 1, further comprising receiving transmission of information for the at least one electronic image.

5. The method of claim 4, wherein the information for the at least one electronic image comprises an eyewitness account.

6. The method of claim 1, wherein processing comprises establishing a pattern of behavior.

7. The method of claim 1, further comprising sorting the at least one electronic image by a license plate shown in the at least one electronic image.

8. The method of claim 7, further comprising searching a database for the license plate in the at least one electronic image.

* * * * *